(12) United States Patent
Kato et al.

(10) Patent No.: US 7,689,683 B2
(45) Date of Patent: Mar. 30, 2010

(54) SYSTEM FOR MANAGING OBJECT IN VIRTUAL SPACE

(75) Inventors: Hiroki Kato, Kanagawa (JP); Yoichiro Serita, Shizuoka (JP)

(73) Assignee: Sony Computer Entertainment Inc., Tokyo (JP)

( * ) Notice: Subject to any disclaimer, the term of this patent is extended or adjusted under 35 U.S.C. 154(b) by 486 days.

(21) Appl. No.: 11/635,393

(22) Filed: Dec. 7, 2006

(65) Prior Publication Data

US 2007/0136424 A1 Jun. 14, 2007

(30) Foreign Application Priority Data

Dec. 9, 2005 (JP) ............... 2005-356072

(51) Int. Cl.
*G06F 15/173* (2006.01)
(52) U.S. Cl. ..................................... 709/223
(58) Field of Classification Search ................. 709/223, 709/224, 238
See application file for complete search history.

(56) References Cited

U.S. PATENT DOCUMENTS

| 649,670 | A | * | 5/1900 | McCulloch | 4/339 |
|---|---|---|---|---|---|
| 4,445,277 | A | * | 5/1984 | Keefe | 33/197 |
| 4,455,602 | A | * | 6/1984 | Baxter et al. | 710/5 |
| 4,493,027 | A | * | 1/1985 | Katz et al. | 712/228 |
| 4,525,780 | A | * | 6/1985 | Bratt et al. | 711/163 |
| 5,295,139 | A | * | 3/1994 | Palmer | 370/255 |
| 5,361,349 | A | * | 11/1994 | Sugita et al. | 707/8 |
| 5,587,338 | A | * | 12/1996 | Tseng | 438/672 |
| 5,655,101 | A | * | 8/1997 | O'Farrell et al. | 711/148 |
| 6,253,254 | B1 | * | 6/2001 | Erlenkoetter et al. | 719/316 |
| 6,490,255 | B1 | * | 12/2002 | Kiriha et al. | 370/254 |
| 7,082,464 | B2 | * | 7/2006 | Hasan et al. | 709/223 |
| 7,168,084 | B1 | * | 1/2007 | Hendricks et al. | 725/42 |
| 7,200,662 | B2 | * | 4/2007 | Hasan et al. | 709/226 |
| 7,207,053 | B1 | * | 4/2007 | Asmussen | 725/42 |
| 7,469,411 | B2 | * | 12/2008 | Chiu | 720/601 |

* cited by examiner

*Primary Examiner*—David Y Eng
(74) *Attorney, Agent, or Firm*—Katten Muchin Rosenman LLP

(57) ABSTRACT

An object management device using at least partially the object in the virtual space, which is divided into ordered partial space regions, as a target of management, wherein the object used as the management target has an ordering key which is defined in relation to an order related to a partial space region and calculated by a client device, and by using this ordering key, the object which is used for management is selectively defined among objects as candidates for the target of the management.

8 Claims, 9 Drawing Sheets

OBJECT MANAGEMENT DEVICE

FIG.4
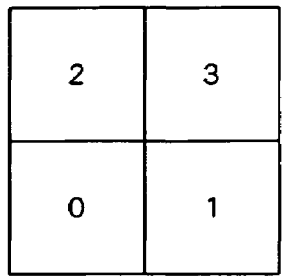
FIG.5
| IDENTIFICATION INFORMATION | COORDINATE INFORMATION | ATTRIBUTE INFORMATION | NETWORK ADDRESS OF COMPUTER DEVICES |
|---|---|---|---|
| 00 : 00 | aaaa | bbbb | cccc |
| 10 : 10 | dddd | eeee | ffff |
| ⋮ | ⋮ | ⋮ | ⋮ |
FIG.6
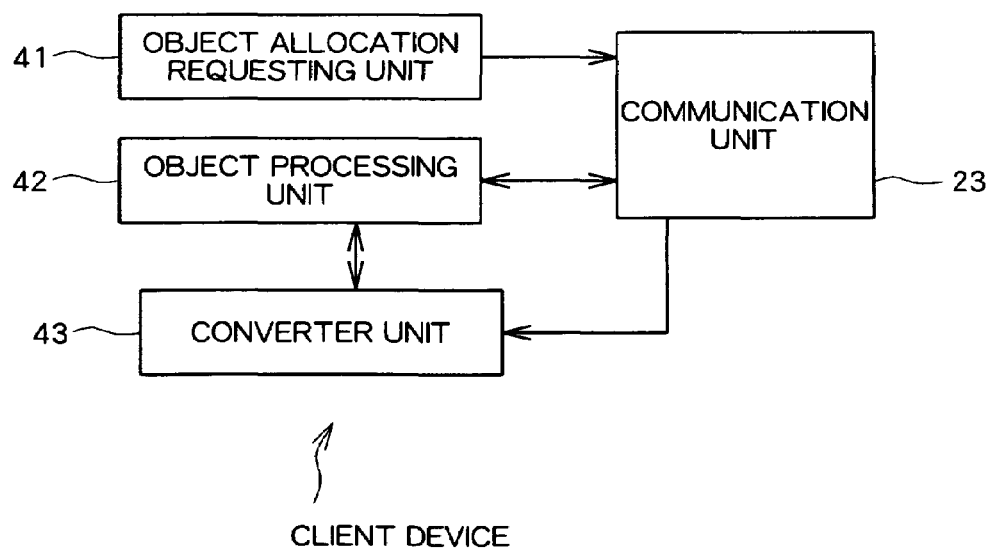
CLIENT DEVICE

○ : OBJECT

FIG. 10A

| 22 | 23 | 32 | 33 |
|----|----|----|----|
| 20 | 21 | 30 | 31 |
| 02 | 03 | 12 | 13 |
| 00 | 01 | 10 | 11 |

| 22 | 23 | 32 | 33 |
|----|----|----|----|
| 20 | 21 | 30 | 31 |
| 02 | 03 | 12 | 13 |
| 00 | 01 | 10 | 11 |

| 22 | 23 | 32 | 33 |
|----|----|----|----|
| 20 | 21 | 30 | 31 |
| 02 | 03 | 12 | 13 |
| 00 | 01 | 10 | 11 |

| 22 | 23 | 32 | 33 |
|----|----|----|----|
| 20 | 21 | 30 | 31 |
| 02 | 03 | 12 | 13 |
| 00 | 01 | 10 | 11 |

|   | 0 | 1 | 2 | 3 |
|---|---|---|---|---|
| 0 | — | 10 | — | — |
| 1 | — | — | — | — |
| 2 | — | — | — | — |
| 3 | — | — | — | — |

OBJECT FOR ORDERING VALUE "00"
MANAGEMENT DEVICE FOR ROUTING TABLE

FIG. 11B

|   | 0 | 1 | 2 | 3 |
|---|---|---|---|---|
| 0 | 00 | — | — | — |
| 1 | — | — | — | — |
| 2 | — | — | — | — |
| 3 | — | — | — | — |

OBJECT FOR ORDERING VALUE "10"
MANAGEMENT DEVICE FOR ROUTING TABLE

FIG.12A

|   | 0 | 1 | 2 | 3 |
|---|---|---|---|---|
| 0 |   | 10,11 |   |   |
| 1 |   |   |   |   |
| 2 |   |   |   |   |
| 3 |   |   |   |   |

FIG.12B

|   | 0 | 1 | 2 | 3 |
|---|---|---|---|---|
| 0 | 00 | – | – | – |
| 1 | – | 11 | – | – |
| 2 | – | – | – | – |
| 3 | – | – | – | – |

FIG.12C

|   | 0 | 1 | 2 | 3 |
|---|---|---|---|---|
| 0 | 00 | – | – | – |
| 1 | 10 | – | – | – |
| 2 | – | – | – | – |
| 3 | – | – | – | – |

SYSTEM FOR MANAGING OBJECT IN VIRTUAL SPACE

CROSS-REFERENCE TO RELATED APPLICATION

The priority application number JP 2005-356072 upon which this patent application is based is hereby incorporated by reference.

BACKGROUND OF THE INVENTION

1. Field of the Invention

The present invention relates to an object management system to manage an object in a virtual space by using a computer.

2. Description of the Related Arts

In a game or a chat program, processing for setting a virtual space to operate a variety of objects allocated in this virtual space is occasionally carried out. For example, in a game such as a network game having a plurality of participants, individual players share information in the virtual space as a game space to participate in this virtual space as a player object. Then, for example, players carry out an operation to obtain the object of an item (item object) allocated in a position in the virtual space and also the operation of an attack to other player objects.

On this occasion, the position and attribute information of individual objects in the virtual space is managed by a computer operating as an object management device.

However, in recent years, the quality of content of an application such as a game using the virtual space has become higher, and the number of objects allocated in the virtual space has increased. On the other hand, for example, in the case where the object of a user moves to the position where the object of an item is allocated, and control is carried out such as obtaining the item object, the object of the user knows which item object is in a near place by supplying a query about the item object existing around the object of the user to the object management device managing the objects in the virtual space. In addition, if required, the object management device executes the processing, which is exemplified by removing the item object and adding the attribute to a user's object, of mutual actions between objects. Alternatively, the object management device occasionally executes the detection of a collision between moving objects existing in the virtual space and the process of a collision notification to the object for which the collision is detected. In these processing operations, an increased number of objects and a widened virtual space to be managed increase frequency of the processing and a calculation time necessary for the processing which makes managing the object in the virtual space by one object management device difficult.

Thus, for example, it is assumed that a plurality of object management devices manage different species of objects by dispersing them. On this occasion, for example, as known from the example as described above, when the user's object executes the processing to obtain the item object, it is necessary to perform mutual communication of information for comparison of the position of the user's object with the position of the item object between the plurality of object management devices managing each of the user's object and the item object. As described above, in the case of managing by dispersing using the plurality of object management devices, as a rule the processing becomes complex. On the other hand, in an application, in which the object moves frequently in the virtual space, on each occasion of object movements, it becomes necessary to search the object management device managing the region to which the object moved, which generally tends to make the processing for the search complex.

SUMMARY OF THE INVENTION

The present invention is created in consideration of the situation as described above and has an aim to provide an object management system making it possible to specify which object management device manages a target object by simple processing in dispersing management of the object in the virtual space by the plurality of object management devices, resulting in reduction of a processing load.

The present invention for solving the problem of the conventional example as described above comprises an object management system comprising: at least one client device requesting allocation of one or more objects at the designated position in a virtual space, where the virtual space divided into a ordered plurality of partial spaces, and at least one object management device to execute processing concerning one or more objects in the target regions as management target objects, where the target regions are one or more said partial spaces, wherein in the client device, an ordering key enabling to define an ordering relation between each of the partial spaces is calculated for the object becoming a candidate for the target of the management by the object management device, and the object management device decides whether or not to execute the processing concerning the object requested by the client device on the basis of the ordering relation between the ordering key calculated by the client device and the partial space contained in the target region of the object management device and, when the execution is determined, executes the processing concerning the requested object.

BRIEF DESCRIPTION OF THE DRAWINGS

FIG. 4 is a graphical illustration showing an example of the Z-ordering.

FIG. 5 is a graphical illustration showing an example of content of an object database held by the object management device according to the embodiment of the present invention.

FIG. 6 is a functional block diagram of a computer device operating as a client device according to the embodiment of the present invention.

FIGS. 10A, 10B, 10C, and 10D are graphical illustrations showing an outline of an operation of the process for dividing the virtual space by the object management device according to the embodiment of the present invention.

FIGS. 11A and 11B are graphical illustrations showing an example of a routing table used by the object management system according to the embodiment of the present invention.

FIGS. 12A, 12B, and 12C are graphical illustrations showing a variety of examples of the routing table used in the object management system according to the embodiment of the present invention.

DESCRIPTION OF THE PREFERRED EMBODIMENT

Figure 1:
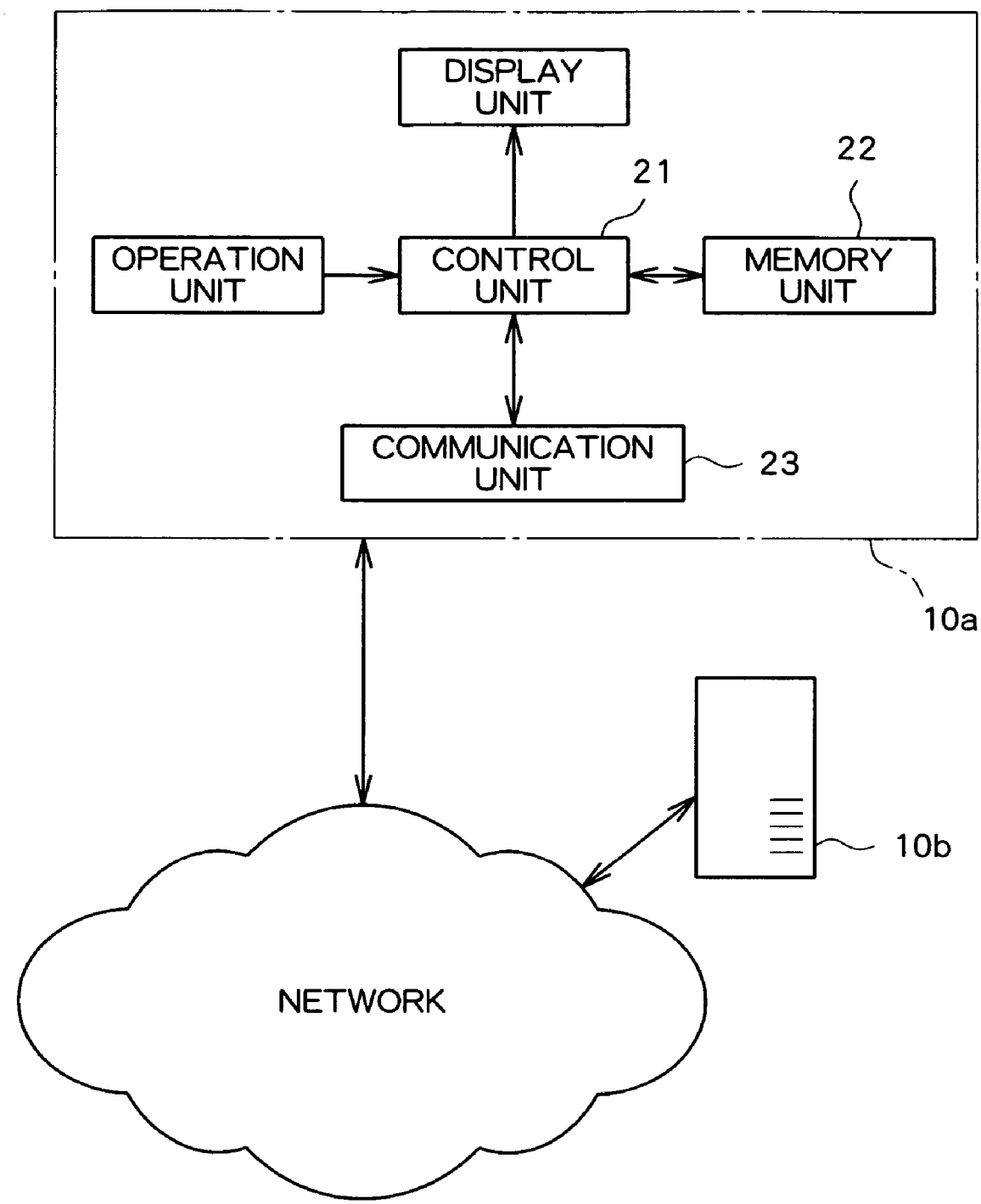
FIG. 1 is a block diagram showing a configurational example of an object management system according to an embodiment of the present invention.

The embodiments according to the present invention will be described as follows with reference to the drawings. The object management system according to an embodiment of the present invention is, as shown in FIG. 1, constituted by containing a plurality of computer devices 10a, b, etc. The plurality of computer devices 10 are connected to each other via a network so as to be capable of communication. In addition, these computer devices 10 are each constituted by containing a processing unit 21, memory unit 22, and communication unit 23. On the other hand, computer devices 10 actually operated by a user may be otherwise constituted by comprising a controlling device such as a game controller, mouse, keyboard and a display unit such as a display (FIG. 1). On this occasion, the controlling device that accepted the operation of the user sends the content to processing unit 21 and the display unit displays an image and a character according to a designation from the processing unit 21.

Here, the processing unit 21 is a program controlled device such as a CPU and operates according to a program stored in memory unit 22. In this embodiment, according to whether the computer device 10 requests to allocate the object in the virtual space to operate as a side (client side) requesting the processing concerning the object, or the computer device 10 operates as a side of a device (the object management device) operating the processing concerning the object, the content of the processing operated by this processing unit 21 becomes changeable. A specific example of the operation of this processing unit 21 will be described later in detail.

The memory unit 22 is constituted by containing a memory device such as RAM and ROM, and a hard disk. This memory unit 22 functions as a computer readable recording medium storing a program executed by the processing unit 21. On the other hand, this memory unit 22 also functions as a work memory to hold a variety of data necessary for the operation of the processing unit 21.

The communication unit 23 includes a network interface and sends out a variety of data to another computer device 10 via the network according to a designation inputted from processing unit 21. In addition, this communication unit 23 outputs data received from other computer device 10 to the processing unit 21 via the network.

In this object management system, information concerning the virtual space is provided by computer device 10 operating as the object management device. For example, individual computer devices 10 share information concerning at least one object allocation position in a plane space (space spanned by X-Y coordinate axes) shown in FIG. 2.

On the other hand, each object is related to ID information (identifier) defined specifically for the object to be identified. In addition, each object may be related to attribute information. These ID information and attribute information are also shared by individual computer devices 10. Attribute information includes, for example, information representing kinds of objects, information defining an external appearance, and a variety of information according to kinds of objects. Here, information according to kinds of objects includes, for example, in the case of a player's object of a game, information about an inventory.

[Object Management Device]

Figure 3:
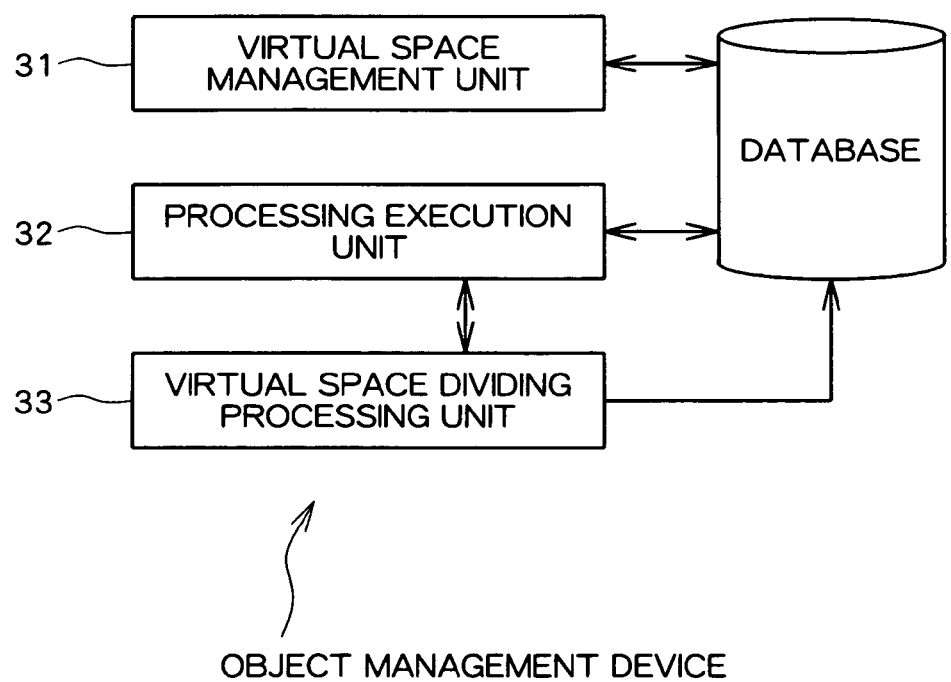
FIG. 3 is a functional block diagram showing a computer device operating as the object management device according to the embodiment of the present invention.

In the present embodiment, at least one of these computer devices 10 operates as the object management device. The control units 21 of the computer devices 10 operating as this object management device are, as shown in FIG. 3, functionally constituted by containing a virtual space management unit 31, a processing execution unit 32, and a virtual space dividing processing unit 33.

Figure 2:
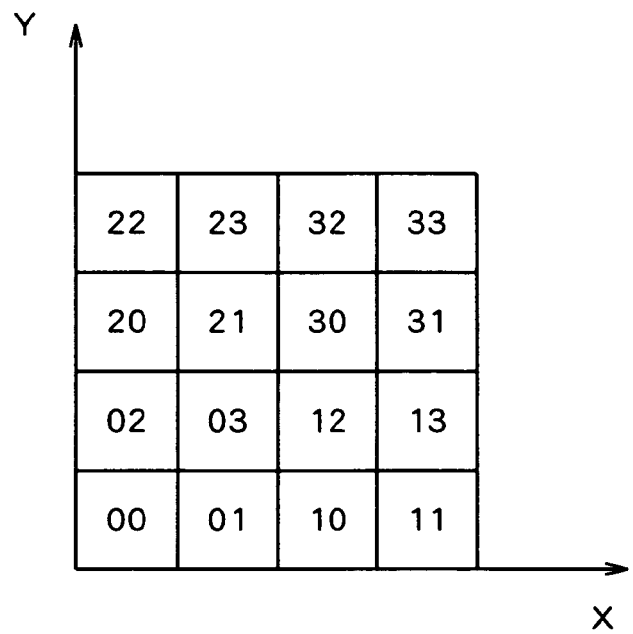
FIG. 2 is a graphical illustration showing an example of a virtual space managed by the object management system according to the embodiment of the present invention.

The virtual space management unit 31 manages the virtual space by dividing into partial space regions, for which order is designated. The virtual space management unit 31 divides the whole of the virtual space into a 4×4 matrix, as shown in FIG. 2, for example, to allocate a number in Z-ordering (refer to Shashi Shekhar and Sanjay Chawla, Spatial Databases. Prentice-Hall, 2003). Here, the Z-ordering is an order made by assigning, in a 2×2 matrix as shown in FIG. 4, a left bottom, right bottom, left top, and right top to 0, 1, 2, and 3, respectively. In the case of the 4×4 matrix, the 4×4 matrix is divided into four 2×2 matrices to determine an ordering number of the last digit in the partial space regions of each 2×2 matrix by the method described above. Then, each 2 ×2 matrix makes one block and the block is arranged in the 2×2 matrix. Hence, the last second digit value of the ordering value of the partial space region contained in each block is determined by the method as described above. Then, the ordering value of the left top partial space region is "22" and, serially, the ordering values of the partial space regions sequentially adjacent to the right side are 23, 32, and 33 (refer to FIG. 2).

If the target virtual space is 3-dimensional, coordinates projected to a plane may be treated as the target space.

On the other hand, for example, in the virtual space where users' chat is taking place, on the basis of a previously accumulated database of words used in a chat, 2-dimennsional projection is carried out by a method such as Quantification Method III to convert to the position in a 2-dimennsional space on the basis of the content of the chat of individual users enabling treatment as the target object.

The object management device according to the present embodiment assigns one of the objects allocated in the virtual space, as the management target, and holds information concerning the management target objects in the database stored in memory unit 22. Then the device executes the processing related to the objects. The following description deals with one example of the processing related to the objects as the processing of a message exchange between objects.

One of the characteristics of the present embodiment is that at least part of the identification information of the object management devices is defined according to the ordering number of the partial space region, which is the target region for the processing by the object management device and has an arbitrary size, and that each of object management devices determines the target region according to the ordering relation between a self ordering value and the ordering value of each of partial space regions. Here, the ordering relation is, when the ordering value is a numeric value, for example, a large and small relation and, when the ordering value is determined by a link to the next order, for example, the order determined by the link. In this embodiment, the ordering value is simply assumed to be a numeric value and thus each of object management devices manages a set of partial regions from the self ordering value to the ordering value of the object management device having the next magnitude value as the target region.

The object management device manages the object by, for example, relating the ID information to identify the object for each object, coordinates information expressing the allocated position of the object, attribute information, and information (for example, the network address of the computer devices 10) for identifying a client device that carried out an allocation request, and storing in the memory unit 22 (FIG. 5) as the object database.

The client device and the object management device may send the message to the ordering value of the partial region as an address. This message is controlled so as to be sent to the object management device managing (containing the target region) the partial region corresponding to the ordering value assigned to the address.

For example, when the object management device expressed with the ordering value "00" and the object management device expressed with the ordering value "10" exist on the network, the object management device "00" manages partial regions "00", "01", "02", and "03", the object management device "10" manages partial regions "10", "11", "12", "13", "20", "21", "22", "23", "30", "31", "32", and "33", and the message addressing the ordering value "11" is sent to the object management device "10". As a result, the object management device makes a decision as to whether or not to execute the processing concerning the object on the basis of the ordering relation between the ordering value of the object and the ordering value allocated to the partial space region contained in self target region.

When a plurality of object management devices are used, routing is required for transferring the message between object management devices. Therefore, the computer device 10 operating as the object management device holds a routing table for the transfer. Setting this routing table is also executed in relation to the ordering value. The example of the content of this routing table and the example of the processing using the content will be described later.

Processing execution unit 32 executes the processing according to the request received from the client device. For example, this processing execution unit 32 carries out the processing for allocating the object in the virtual space according to the request of allocation of the object. On the other hand, this processing execution unit 32 carries out the processing for detecting the object around the target object using an object as the target object and the processing for detection of collision between objects. These processings will be described later.

The virtual space dividing processing unit 33 obtains information about the processing load for each predetermined time (for example, periodically with a specific interval). Then, when information about the processing load indicates a value exceeding a predetermined processing load, the unit 33 executes the processing (virtual space dividing processing) for the request to the client device to activate as the object management device Here, information about the processing load may, for example, be the number of objects as the management target. In the case of using the number of objects, when the number of objects as the management target exceeds a predetermined threshold value, the virtual space dividing processing is executed. This virtual space dividing processing will also be described later.

[Client Device]

On the other hand, the processing unit 21 of the computer device 10, which operates as the client device, is functionally, as shown in FIG. 6, constituted by containing an object allocation requesting unit 41, object processing unit 42, and converter unit 43. In the memory unit 22 of computer device 10 operating as this client device, an address value of the object management device on at least one of the networks is stored.

The object allocation requesting unit 41 instructs allocation of the object in the virtual space to the object management device by making an allocation request for the object. The client device calculates the ordering value of the partial region, in which the object exists, on the basis of the position (coordinates information) of the object in the virtual space region. Then, using the ordering value calculated from the position of the object in the virtual space as the address, the client device sends the allocation request to the object management device.

When the allocation position of the object changes by moving in the virtual space, in other words, when the ordering value calculated from the position in the virtual space changed, the object allocation requesting unit 41 notifies the object movement addressing to a former ordering value before the movement and carries out the allocation request for the object addressing a new ordering value after the movement.

Object processing unit 42 receives, for example, the user's designation as the message from the allocated object, for searching for other objects existing around the object. Then, on the basis of this designation, the object processing unit 42 assigns the partial region in which the object that made the request exists as noted region, and the object processing unit 42 computes the ordering value of the noted region, and the ordering values on the partial regions next to the noted region (adjacent regions). The object processing unit 42, then, executes the processing such as sending the messages for requesting list of objects which exist in each adjacent regions. Here, the messages are sent to the ordering values of adjacent regions as using the ordering values as addresses.

The converter unit 43 receives the request to activate as the object management device and starts up the processing as the object management device. As a result, the computer device 10 starts the execution of the processing as the object management device in combination with the processing as the client device.

As the address, not only the ordering value but also the identification key defined by the predetermined method may be used. Using an identification key enables prevention of centering of messages on a specific object management device (or message transfer device described later) in message delivery described later. As this identification key, the identification key generated from the information of the object may be used, or the identification key of a client that carried out the allocation request of the object may be used.

The operation of the system according to the present embodiment will be described below with reference to an actual operation example. Here, it is assumed that the virtual space, in which objects are allocated, is, as shown in FIG. 2, divided into 4×4 partial space regions and ordering values are allocated as shown in FIG. 2. In addition, here, a message distribution request uses the identification information allocated to the object management device as the address of the message. In other words, object management devices receive a message, when the message addressed to the identification information allocated to each of them arrives. On the other hand, in the client device, the value of the address of the object management device on at least one network is previously defined.

At the starting point of the processing, the computer device 10 operating as the object management device may be a single device. On this occasion, the single object management device manages objects of all the partial space regions. In the following description for the identification information of the object management device, the least ordering value among ordering values in the partial space regions managed by the object management device is used. Namely, in the initial state, the ordering value "00" is allocated to the object management device managing objects in all the partial space regions as the ordering key of the identification information. On the other hand, a specific value regardless of the ordering value is issued for the identification key. Here, it is assumed that "00" is allocated as the identification key.

This identification key may also be generated on the basis of the positional information (for example, IP address) of the object management device on the network. In such a way, using the identification key in preparation of the routing table described later makes it possible to optimize message distribution based on the network distance.

In the following sections, the identification information is expressed as "00:00" by connecting the ordering value and the identification key using a colon (:) in this order.

This object management device operates the object allocation request from the computer device 10 operating as the client device, the processing for searching the object existing around the object, and the processing for carrying out the detection of the collision between objects.

The client device sends the allocation request to an arbitrary object management device to the ordering value calculated from the position of the object in the virtual space as the sending address. As already described, the address information contains not only the ordering value but also the identification key. In other words, the client device sends the allocation request of the object containing the identification information as the address using the address of the arbitrary object management device, which has been previously stored, as the sending address. Then, the object management device that received this request determines the object management device that will process the allocation request on the basis of the address contained in the allocation request and send the request to the object management device. The object management device, when determining the address as indicating itself, processes the allocation request by itself.

At this point, the object management device is single, and thus the object management device having the ordering value of the identification information "00" responds to the allocation request. At the point of carrying out the allocation request, the client device cannot identify the object management device to operate the object management related to the allocation request. However, by using the ordering value calculated from the virtual space information to be allocated, the message is sent to the object management device managing the region, in which the object exists, according to the message distribution method on the basis of the routing table described later.

The object management device creates relations among the ID information of the object, the coordinates information expressing the allocation position, the attribute information, and information (for example, a network address of the computer device 10) for identifying the client device carried out the allocation request, and stores this information in the memory unit 22 as an object database (FIG. 5).

Figure 7:
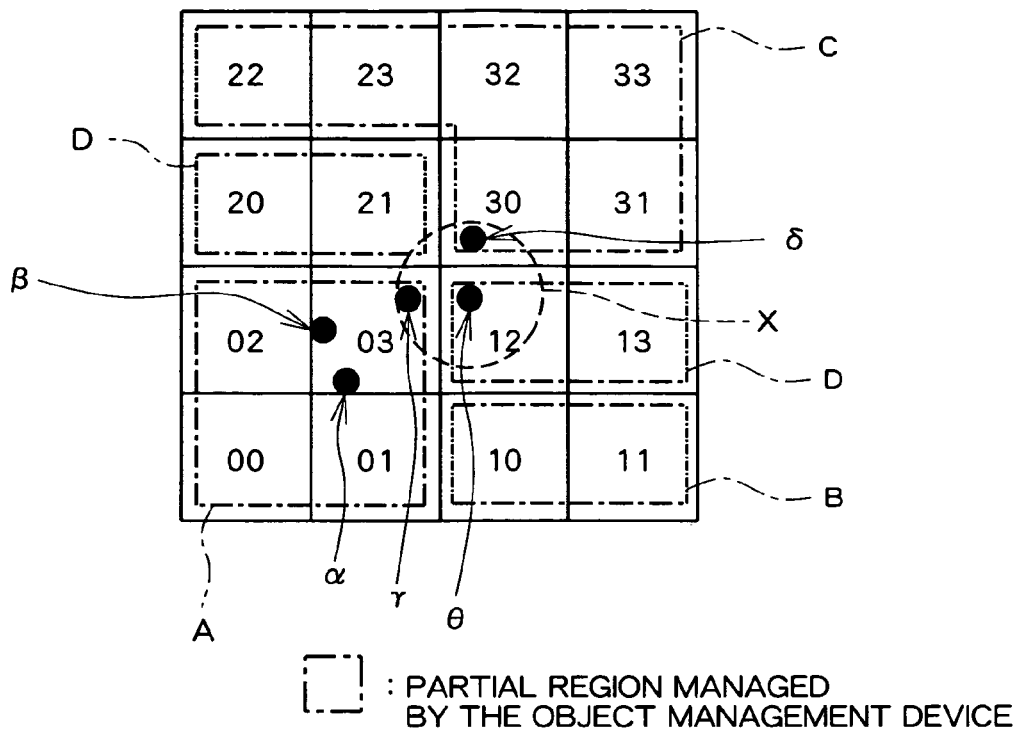
FIG. 7 is a graphical illustration showing a status example in searching another object near one object in the object management system according to the embodiment of the present invention.

In this way, for example as shown in FIG. 7, objects α, β, and γ corresponding to the ordering value "03," object θ corresponding to the ordering value "12," and object δ corresponding to the ordering value "30" are allocated, the object management device A having the ordering value "00" manages objects α, β, and γ, the object management device D having the ordering value "12" manages object θ, and the object management device C having the ordering value "22" manages objects δ.

Next, as shown in FIG. 7, when the object θ requests a message exchange with the object located in the region (the region X shown by a broken line circle in FIG. 7) within a specific distance r from the position of the object θ, the client device that carried out the allocation request of the object θ calculates the ordering values "03", "12", "21", and "30" of the partial region which intersect with the region X as described above. Then, the message requesting the information of the object in the region X is sent to the address, which has been previously stored, of the object management device. Here, the object management device A receives the message and the message is distributed to the object management device corresponding to each ordering value.

Here, the message is distributed to each of the object management device A itself for the partial region of the ordering value "03", the object management device D for the partial region of the ordering value "12" and "21", and the object management device C for the partial region of the ordering value "30". Each of the object management devices A, C, and D search the object located in the region from the database of itself on the basis of the received message to send the information of the corresponding object (for example, the ID information of the object and the information of the allocation position) to the client device that made the request. The client device notifies this sent information to the object θ.

In this way, so-called interest management processing can be achieved in a 3-dimensional virtual space application. For example, when the object θ is the user object, in order to draw its field of view, the information of the object existing in the field of view can be obtained. On the other hand, in a chat application, another user close to the current chat content inputted by the user can be found.

In addition, when the processing of the collision detection of the object in the virtual space is desired, in each object management device, the collision detection is operated from the positional information of the object registered in the database of each object management device and, in the event of occurrence of the collision, the collision notification is carried out for each object.

Figure 8:
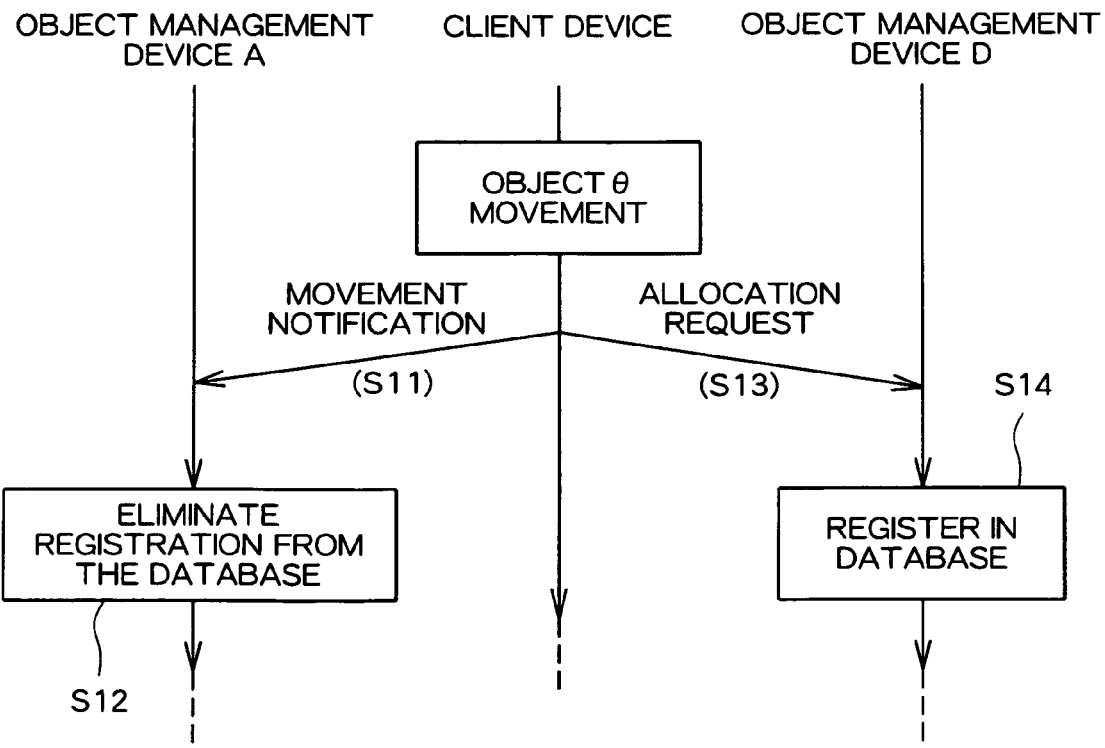
FIG. 8 is a flow diagram showing an example of the processing when the object moves in the object management system according to the embodiment of the present invention.

Moreover, for example, when the object θ moves from the partial region of the ordering value "12" to the partial region of the ordering value "03," the client device managing the object θ sends the notification of the movement of the object θ addressed to the ordering value "12" before the movement (S11 in FIG. 8). This notification of the movement is received by the object management device D managing the partial region of the ordering value "12." The object management device D receives the notification of the movement of the object θ, refers to the database, and eliminates an entry related to the object θ (S12).

The client device carries out the allocation request of the object θ addressing to the ordering value "03" after movement (S13). This allocation request is received by the object management device A managing the partial region of the ordering value "03". The object management device A receives the allocation request of the object θ to add the entry related to the object θ to the database (S14). By this procedure, the movement of the object is achieved. Any of the movement notification or the allocation request may be processed first.

[Virtual Space Dividing Processing]

Here, virtual space dividing processing in the object management device is described as follows. Virtual space dividing processing is carried out as follows. The object management device changes the order of currently (at the starting point of virtual space dividing processing) managing objects in the order of the allocation position. The result of changing the order corresponds, as shown diagrammatically in FIG. 9, to the processing for allocating objects on a number line. The object management device allocates objects which exist in each of the partial space regions on the number line, on which ordering values of the currently managed partial space region are changed in an ascending order from small to large values. Then, the number of objects belonging to the target region is accumulated by selecting the ordering value starting from a small ordering value in the ascending order as target regions on this number line, namely, the currently managing partial space region. Next, the ordering value of the target region at the point where this accumulated number exceeds N/2 based on a total number N of objects is obtained as a dividing point.

Figure 9:
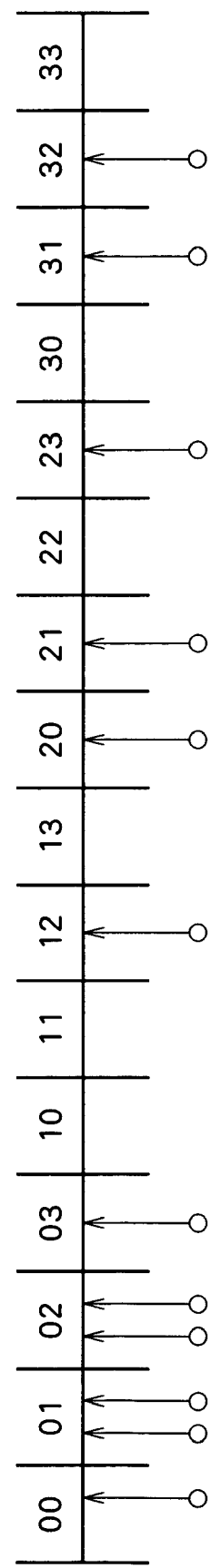
FIG. 9 is a graphical illustration showing an example of allocation of objects managed by the object management device according to the embodiment of the present invention.

The example shown in FIG. 9 assumes that the total number of objects managed in the starting point of the virtual space dividing processing is 12. In this case, the ordering value, for which an accumulated value exceeds 12/2 =6, is sought. In this example, when accumulated, the number of objects starting from the ordering value "00" of the partial space region in the ascending order to the partial space region related to the ordering value "03" exceeds "6", and hence, the ordering value "03" becomes the dividing point.

The object management device finds the object (one or more objects) belonging to the partial space region, where the ordering value is larger than the dividing point, in the computer device 10 as the client device, selects one of the computer devices 10 that performed the allocation request for those objects, and requests to activate as the object management device. Here, for selection of computer devices 10 requesting to activate as the object management device, for example, the object management device may find one or more objects belonging to the partial space region where the ordering value is larger than the dividing point, issue a request to activate as the object management device to all of the computer devices 10 as the client device related to the found object, and select the computer device 10 that responds quickest. On the other hand, the object management device may find the object (for example, if there is a plurality of objects, those having the allocation position closest to the predetermined origin) belonging to the partial space region where the ordering value is smallest among objects belonging to the partial space region where the ordering value is larger than the dividing point, and select the computer devices 10 as the client device that carried out the allocation request for the object.

At this time, the existing object management device includes the information about the ordering value, which should be allocated to a new object management device, in the request to activate as the object management device. Here, the ordering value to be allocated to the new object management device is determined on the basis of the smallest ordering value exceeding the ordering value of the dividing point (for example, the ordering value itself) which belongs to ordering values allocated to the partial space region managed by the object management device that carried out the request.

In this example, the smallest ordering value which exceeds the ordering value "03", among the ordering values of the partial space region contained in the target region of the object management device, in which the ordering value of the dividing point is "03" and the ordering key contained in the identification information is "00", is "10", and hence the ordering key to be allocated to the new object management device is "10".

Each of the object management devices assigns one or more space regions as management targets which satisfy following conditions:

(1) the space regions are not managed by other object management devices, and
(2) the ordering value corresponds to the space regions are equal or greater than the ordering value corresponds to the object management device.

In other words, the object management device having the ordering value "00" assigns a partial space set A, which comprises four partial spaces of "00", "01", "02", and "03" as the target region, and assigns objects existing in this target region as the management target. The object management device having the new ordering value "10" assigns the partial space set B, which is composed of 12 partial space regions related to ordering values of "10" or higher as the target region and treats the objects in the target region as the management target (FIGS. 10A and 10B).

As a result, each object management device carries out the processing on the set composed of 6 objects, and thus the processing load of each object management device is reduced. In addition, in order to achieve sending and receiving of the message between objects managed by object management devices that are different from each other, each object management device sets and holds the routing table for identifying the address of the message.

Below, for example, when the ordering value "21" is determined as the dividing point according to the increase in the load, the object management device managing the object C in the partial space region having the ordering value "22" or higher is set (FIG. 10C), and thereafter, when the ordering value "11" is determined as the dividing point, the object management device managing the object D in the partial space region having the ordering value from "12" to "21" is set (FIG. 10D). In this way, the target region of the initial object management device is divided into two sequential partial space sets and one of them becomes the target region of the initial object management device and the other becomes the target region of the other (new) object management device Here, although description has been given for the example of division of the target region into two sequential partial space sets, it is also possible to set a plurality of dividing points to divide into N partial space sets. In this case, each partial space set is allocated to (N−1) new object management devices.

[Setting the Routing table]

Here, the example of setting the routing table will be described using the processing at the point where the object management device of the ordering key "10" is set as the example. The routing table is set by using the ordering value and the identification key, which are allocated to each of the object management devices. In other words, for example, think of the routing table of the object management device of the ordering key "X". This object management device determines to send the message to another object management device, which is an object management device allocated with the ordering value:

(1) having the longest match among ordering values that have been subjected to right truncation (corresponding to the most significant digit side) to this ordering value, and (2) for which a difference between a number of items of identification information (the value making a group composed of the ordering value and the identification key) is the smallest.

As described above, when there are an object management device of the ordering value "00" and an object management device of the ordering value "10," the routing tables set in each object management device are those as shown in FIGS. 11A and 11B. These routing tables are tables expressing number of digits subjected to right truncation (number of digits corresponding to the front part) in the ordinate direction, and expressing the numeric value of the first digit not corresponding next digit of the right truncation in the abscissa direction. Consequently, the routing table set in the object management device of the ordering value "00" is that in which information (identification information) identifying the object management device of the ordering value "10" is set in the column, in which the digit subjected to right truncation is "0" and the first digit of not subjected to right truncation is "1."

On the other hand, the routing table set in the object management device of the ordering value "10" is that in which information (identification information) identifying the object management device of the ordering value "00" is set in the column in which the digit subjected to right truncation is "0" and the first digit of not subjected to right truncation is "0." Because the first digit does not correspond each other, the first digit "0" is the digit that not subjected to right truncation.

When distribution of the message is requested, each object management device distributes the message to the object management device, for which the ordering key has the maximum value, among object management devices related to the ordering key having a smaller value than that of the address of the message related to the request. In other words, the object management device that received the request of the message distribution obtains the ordering key K0 of the object management device and ordering keys K1, . . . Kn of other object management devices set in the routing table. Then, the device compares the obtained ordering keys K0, K1, . . . Kn with the ordering key Km of the address of the message concerning the request to select the ordering key Ki, where Ki<Km. In addition, the ordering key having the maximum value, Kmax, among the selected ordering keys is selected to examine whether or not the selected ordering key Kmax is equal to K0, namely, whether the ordering key is allocated to the object management device itself that received the request of the message distribution. Here, if Kmax=K0, the object management device obtains the information to identify a computer device 10, which stores the message concerning the distribution request in relation to the object of the designated address to send the message to the computer device 10 identified by the obtained information.

If Kmax is not equal to K0, the information which identifies the computer device 10 operating as the object management device corresponding to the ordering key Kmax is obtained, and then the message is sent to a computer device 10, which is identified by the obtained information, accompanied with the distribution request.

In the examples shown in FIGS. 11A and 11B, when the new object management device is assigned to the ordering value "11" by the virtual space dividing processing, according to this procedure, as shown in FIGS. 12A, 12B, and 12C, the routing table is changed.

Consequently, in the routing table set for the object management device of the ordering value "00," the information is set for identifying the object management device of the ordering value "10" in the column, in which the digit subjected to right truncation is "0" and the first digit of not subjected to right truncation is "1", and similarly, the information is set for identifying the object management device of the ordering value "11" in the column, in which the digit subjected to right truncation is "0" and the first digit of not subjected to right truncation is "1" (FIG. 12A).

Further, in the routing table set for the object management device of the ordering value "10", the information (identification information) is set for identifying the object management device of the ordering value "00" in the column, in which the digit subjected to right truncation is "0" and the first digit of not subjected to right truncation is "0", and similarly, the information is set for identifying the object management device of the ordering value "11" in the column, in which the digit subjected to right truncation is "1" and the first digit of not subjected to right truncation is "1" (FIG. 12B).

Furthermore, in the routing table set for the object management device of the ordering value "11," the information (identification information) is set for identifying the object management device of the ordering value "00" in the column, in which the digit subjected to right truncation is "0" and the first digit of not subjected to right truncation is "0", and the information is set for identifying the object management device of the ordering value "10" in the column, in which the digit subjected to right truncation is "1" and the first digit of not subjected to right truncation is "0" (FIG. 12C).

[Message Transfer Device]

The description so far was given for the example of execution of transferring the message by the object management device. The object management device carries out a variety of processing including not only the message transfer, but also, by receiving the request from the client device related to the object becoming the target of the management, changing the allocation position of the object (i.e. moving the object) and obtaining the object (erasing the object and changing the attribute information), and hence, in accordance with the content of the game or the chat, the processing load increases occasionally.

Then, the computer device 10 (message transfer device) exclusively performing transfer of the message may be set in the virtual space separately from the object management device.

Figure 13:
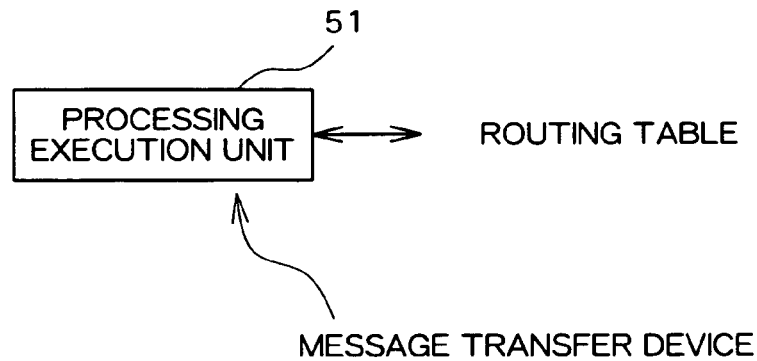
FIG. 13 is a functional block diagram of a computer device operating as a message transfer device according to the embodiment of the present invention.

The message transfer device is almost the same as the object management device and exclusively executes the processing related to the message transfer, is functionally composed containing processing execution unit 51 as shown in FIG. 13, and executes the processing for the message transfer by using the routing table.

It is also assigned the ordering value of any one of the partial space regions in the virtual space to the message transfer device, like the object management device. In other words, the object management device managing the partial space region of the assigned ordering value stores information for identifying a computer device 10, which is assigned to the message transfer device, and the ordering value in the memory in related manner.

The computer device 10 assigned to the message transfer device stores the ordering value allocated to it. The message transfer device also has the routing table and performs message delivery processing with reference to this routing table. Here, the routing table contains the identification information of the message transfer device as a replacement for the identification information of the object management device.

On the other hand, this message transfer device does not perform processing, which is exemplified by moving and eliminating the object and changing the attribute information, other than the message transfer.

This message transfer device may operate by pairing with another object management device. In this type of paired, at least one of the message transfer devices containing an identical ordering value in the identification information is set for each of the object management devices allocated in the virtual space.

Also in this case, each of the message transfer devices, when distribution of a message is requested, distributes the message to the message transfer device having the maximum ordering value, among message transfer devices related to the ordering values smaller than the address of the message related to the request. In other words, the message transfer device that received the request for message distribution obtains the ordering value K0 of the message transfer device and the ordering value K1, . . . Kn of other message transfer devices set in the routing table. Then, the obtained ordering values K0, K1, . . . Kn are compared with the ordering value Km of the address of the message related to the request to select the ordering value of Ki, where Ki<Km. In addition, of the selected ordering values, the ordering value Kmax being the maximum value is selected to examine whether or not the selected ordering value Kmax is equal to the ordering value K0 allocated to the message transfer device itself that received the request for the message transfer. Here, if Kmax=K0, the message transfer device transfers the message to the object management device (same cooperative management device) having a common ordering value (or containing the same ordering value in the identification information). Then, the object management device that received the transfer obtains the previously stored information for identifying the computer device 10 related to the specified address of the transfer request. The object management device then sends the message to computer device 10 identified by the obtained information.

Following the setting of the routing table, if Kmax is not equal to K0 in the determination as described above, the message transfer device distributes the message to another message transfer device, which is the message transfer device having an ordering value with the longest match among ordering values subjected to right truncation allocated to the ordering value contained in the address of the message related to the distribution request, and for which a difference between number of items of identification information (the value making the group composed of the ordering value and the identification key) is the smallest. The identification information may be constituted by the ordering value only, without the use of the identification key. In this case, for example, in the message table, those having the smallest network distance from the message transfer device or the object management device are registered in the routing table to perform the distribution of the message by the processing based on the ordering value.

Figure 14:
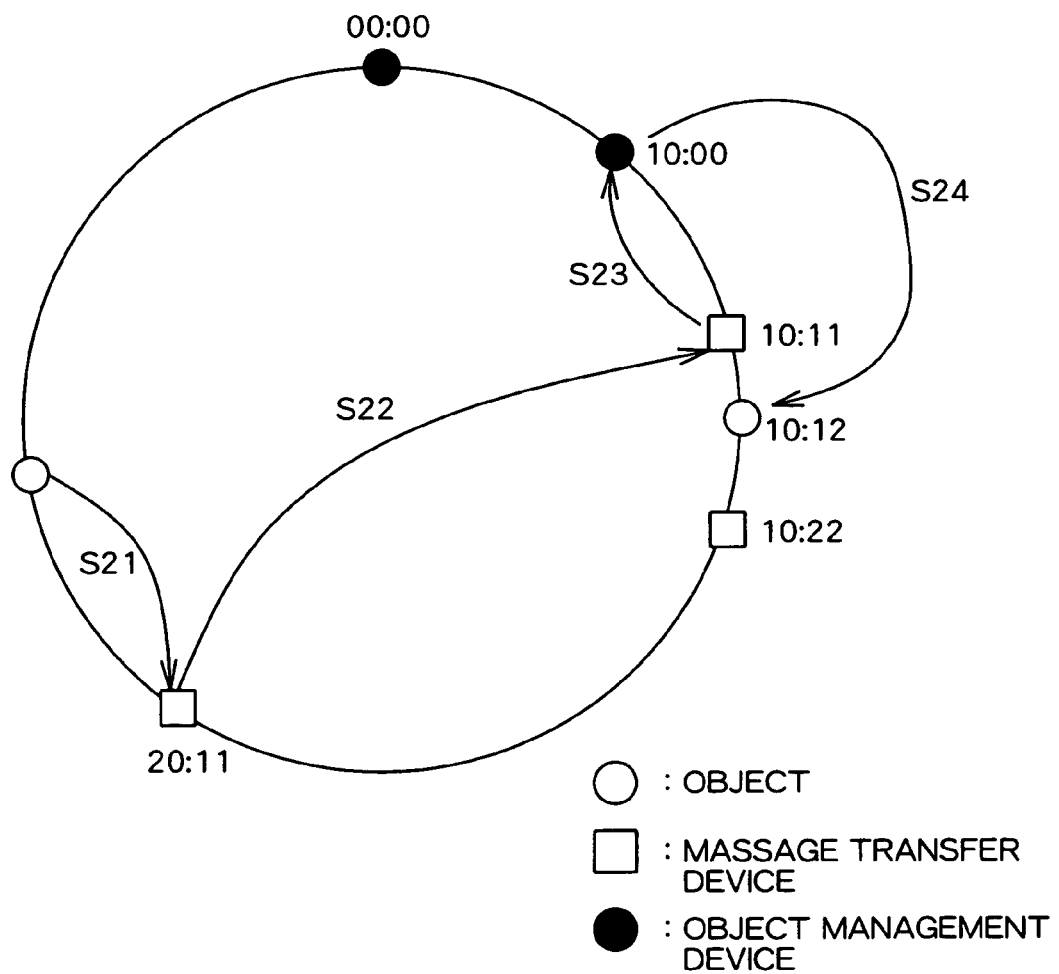
FIG. 14 is graphical illustrations showing an example of routing of the message in the object management system according to an embodiment of the present invention.

For example, as shown in FIG. 14, in the case where the object management device (identification information 10:00) and two message transfer devices (identification information 10:11 and 10:22) are set in the region corresponding to the ordering value "10", and the case where the message to the object of the identification information 10:12 is sent to the message transfer device related to other ordering values (S21), the message is transferred to the message transfer device 10:11 (S22), and transmitted to the object management device 10:00 (S23). Then, the object management device sends the message to the computer device 10 related to the object of the identification information 10:12 (S24).

In this way, using the message transfer device makes it possible to carry out the message transfer to objects other than those of management target by the message transfer device to simply deal with the message related to the object of the management target by the object management device. In this way, the processing load of the object management device can be further reduced.

In FIG. 14, the ends of the number lines expressing the ordering space of the Z order are linked to each other in a wrap around manner (loop form.)

In setting the message transfer device as described above, when the object management device carries out the virtual space dividing processing, it is possible to issue the request for operating as the object management device to one of the message transfer devices so as to set a new object management device.

In this case, the object management device executing the virtual space dividing processing examines whether or not there is a plurality of message transfer devices related to the same ordering value (whether or not there is a partial space region in which a plurality of message transfer devices are set) and when there is a plurality of message transfer devices related to the same ordering value, requests any one of a plurality of message transfer devices to operate as the object management device. This process makes it possible to prevent an occurrence of the partial space region lacking the setting of the message transfer device. In other words, in this case, the designation may be made to operate as the object management device related to the ordering value different from the ordering value contained in the identification information of the message transfer device.

The message transfer device (computer device 10) that received this request sends a notification for exiting from the position at the point where the request was received, to the object management device. The object management device that received this notification removes the message transfer device which sent the request from the virtual space (the identification information is deleted). Next, a computer device 10 that previously operated as the message transfer device sends the request to allocate itself as the object management device to the position of the ordering value which corresponds to the ordering value contained in the request, to the object management device (object management device as the sender of the request to become the object management device) managing the region of the ordering value corresponding to the ordering value. Then, each of these object management devices manages each of the divided partial space regions.

When located in the partial space region to which the dividing point belongs (for example, the dividing point "21" belongs to the region of the ordering value of 10 or higher under the status of FIG. 10B), the object management device may execute the partial space dividing processing under the condition of:

(1) a plurality of the message transfer devices are set,
(2) the part of the plurality of the message transfer devices are related to the ordering value smaller than (or equal to or smaller than) the ordering value become the dividing point, and
(3) others are related to the ordering value equal to or larger than (or larger than) the ordering value of the dividing point. As a result, the object management device may execute virtual space dividing processing under the condition that at least one message transfer device is set in each of partial space regions after division at the dividing point. Then, if this condition is not satisfied, the object management device may interrupt the partial space dividing processing.

For reference, if computer devices 10 operating as the message transfer device or the object management device stop the operation or are disconnected from the network, the message does not reach some of the partial space regions. Then, it may be optionally set that when the message is received, each of the computer devices 10 sends back the notification of the situation (ACK) to the source of message transmission and, when ACK is not received up to a predetermined time (time out) after the message is sent, carries out message transmission again, and when ACK is not received up to a time out period after this repeated message sending, simultaneously sends the request for renewal of routing information to each of these object management devices (or simultaneously to each of the computer devices 10 on the network). For each of these object management devices, one of them initially becomes the identification information "00:00" to manage all of the virtual spaces, followed by sequentially executing the virtual space dividing processing to carry out reconstitution of the routing table and the partial space regions.

As described above, according to the present embodiment, the object management device defines the region as the management object on the basis of the ordering value allocated to the virtual space. As a result, when a plurality of object management devices perform the management by dispersing objects in the virtual space, which object management device manages the target object can be identified by a simple processing to reduce the processing load.

While the present invention is described in terms of preferred or exemplary embodiments, it is not limited thereto.

What is claimed is:

1. An object management system, comprising:
a virtual space divided into an ordered plurality of partial spaces;
at least one object management device comprising an object management unit for managing at least one object allocated in a target region formed of a sequential order of partial spaces in the virtual space;
at least one client device specifying a partial space including a position where the object is to be allocated, and instructing the at least one object management device to allocate the object in the specified partial space of the virtual space, wherein
the at least one object management device, in response to the allocation instruction, determines whether or not the specified partial space is included in the target region based on the ordering relation of partial spaces, and
the at least one object management device allocates the object in the specified position of the partial space when the partial space is determined to be included in the target region.

2. The object management system according to claim 1, further comprising:
a message transfer unit, being related to the object management unit, which receives a message transfer request specifying a partial space including a position where the object is allocated, and, in response to the message transfer request, determines whether or not the specified partial space is included in the target region based on the ordering relation of partial spaces, and, when the partial space is determined to be included in the target region, transfers the message to the object management unit, and, when the partial space is determined not to be included in the target region, transfers the message to other message transfer unit.

3. An object management device, comprising:
an object management unit for managing at least one object allocated in a target region formed of a sequential order of partial spaces in the virtual space divided into an ordered plurality of partial spaces;
a request receiving unit for receiving an allocation instruction specifying the partial space including a position where the object is to be allocated;
a determination unit for determining, in response to the allocation instruction, whether or not the specified partial space is included in the target region based on the ordering relation of partial spaces; and
an object allocation unit for allocating the object in the specified position of the partial space when the partial space is determined to be included in the target region.

4. The object management device according to claim 3, wherein
the order of each of the partial spaces is defined on the basis of an ordering key allocated to each of the partial spaces, and
the determination unit determines whether or not the partial space specified by the allocation instruction is included in the target region using the ordering keys.

5. The object management device according to claim 3, wherein
the order of each of the partial spaces is defined on the basis of a number allocated to each of the partial spaces in Z-ordering, and
the determination unit determines whether or not the partial space specified by the allocation instruction is included in the target region using the numbers allocated in Z-ordering.

6. The object management device according to claim 3, further comprising:
a target region dividing unit for dividing the target region into a plurality of partial space sets respectively formed of a sequential order of partial spaces, for using any one of the plurality of partial space sets as new self target region of the object management device, and for requesting other objection management devices to use each of the other partial space sets as the target region of the other object management devices.

7. An object management method, comprising:
managing at least one object allocated in a target region formed of a sequential order of partial spaces in the virtual space divided into an ordered plurality of partial spaces;
receiving an allocation instruction specifying the partial space including a position where the object is to be allocated;
determining, in response to the allocation instruction, whether or not the specified partial space is included in the target region based on the ordering relation of partial spaces; and
allocating the object in the specified position of the partial space when the partial space is determined to be included in the target region.

8. A computer-readable recording medium having instructions stored therein which when executed, cause a computer to implement a process comprising:
managing at least one object allocated in a target region formed of a sequential order of partial spaces in the virtual space divided into an ordered plurality of partial spaces;
receiving an allocation instruction specifying the partial space including a position where the object is to be allocated;
determining, in response to the allocation instruction, whether or not the specified partial space is included in the target region based on the ordering relation of partial spaces; and,
allocating the object in the specified position of the partial space when the partial space is determined to be included in the target region.

* * * * *